March 26, 1929.    E. F. HUOT    1,706,403
FISH SCALER
Filed May 21, 1927
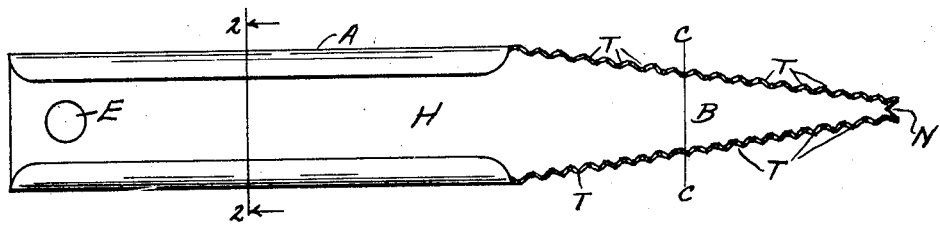
FIG. 1.
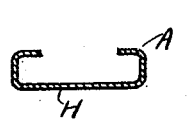   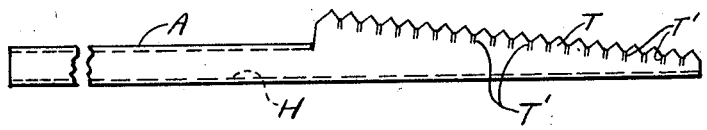
FIG. 2.    FIG. 3.
INVENTOR:
Eugene F. Huot
BY David E. Carlsen
ATTORNEY.

Patented Mar. 26, 1929.

1,706,403

UNITED STATES PATENT OFFICE.

EUGENE F. HUOT, OF ST. PAUL, MINNESOTA.

FISH SCALER.

Application filed May 21, 1927. Serial No. 193,309.

This invention relates to a device particularly useful for fishermen or others who are engaged in catching or cleaning fish. The object of the invention is to provide a simple, highly efficient and inexpensive fish scaler which is not only a scaler, but has other features hereinafter to be described and all as illustrated in the accompanying drawing in which:

Fig. 1 is a plan view of my improved fish scaler.

Fig. 2 is a sectional elevation of the handle of the fish scaler as at line 2—2 in Fig. 1.

Fig. 3 is a side elevation of Fig. 1.

Referring to the drawing by reference letters, my device is made of a single piece of elongated sheet metal forming a handle A and a tapered front end B of channel shape in cross section as at C—C in Fig. 1. The opposite upwardly directed edges of said tapering part comprises each a row of teeth T. These teeth in each row are arranged on a forwardly and downwardly directed slope toward the front end of the device as shown in Fig. 3. The front ends of said rows of teeth terminate in spaced relation being close to each other, the metal in the base H of said rows of teeth being notched inwardly as at N, in Fig. 1. Each tooth is bulged outwardly to its point, and at the base of the teeth transverse depressions T' are punched inwardly in the metal providing for a stronger tooth construction by accentuating the semi-tubular shape of the teeth. The use of fish scalers in general is so well known, that this need not be mentioned in this case. The handle of this device is formed in channel shape as shown in Fig. 2, the metal being bent upwardly from the base H, and then inwardly in spaced relation to the base. The scraper element is a forwardly alined continuation of the base part H, and being formed of channel shape in cross section as previously described. The entire construction is of maximum strength and of extreme simplicity.

It is obvious that in the use of my device the operator simply grasps the handle A, with the tooth side of the scaler down for scaling fish in the usual manner. The notch N in the reduced front end of the device provides means for the operator to remove a hook from the mouth of a fish where such hook is otherwise inaccessible.

I claim:

1. In a fish scaler comprising an elongated piece of sheet metal and a portion of said sheel metal formed with parallel upward and thence inwardly directed short flanges to form a handle; fish scaling means forward of said handle comprising a tapered continuation of the base of said handle the said tapered part channel shaped in cross section, the edges of each flange of the latter comprising a row of teeth, the front ends of said toothed flanges terminating in transversely spaced relation to each other, said base of the scaler part, between the front ends of said toothed flanges formed with an inwardly directed notch for the purpose set forth.

2. The structure specified in claim 1, in which said teeth are bulged outwardly toward their points and the metal at the base between each pair of teeth is depressed inwardly for strengthening the tooth structure, as set forth.

In testimony whereof I affix my signature.

EUGENE F. HUOT.